United States Patent
Robinson et al.

(10) Patent No.: US 8,759,250 B2
(45) Date of Patent: Jun. 24, 2014

(54) COMPOSITE ADSORBENT MATERIAL

(75) Inventors: Eric Robinson, Lisburn (GB);
Wilhelmina Margaretha Theresia Maria Reimerink-Schats, Amersfoort (NL)

(73) Assignee: Cabot Norit Nederland B.V., Amersfoort (NL)

( * ) Notice: Subject to any disclaimer, the term of this patent is extended or adjusted under 35 U.S.C. 154(b) by 752 days.

(21) Appl. No.: 12/598,223

(22) PCT Filed: May 2, 2008

(86) PCT No.: PCT/NL2008/050270
§ 371 (c)(1),
(2), (4) Date: Mar. 23, 2010

(87) PCT Pub. No.: WO2008/133520
PCT Pub. Date: Nov. 6, 2008

(65) Prior Publication Data
US 2010/0173772 A1   Jul. 8, 2010

(30) Foreign Application Priority Data

May 1, 2007 (GB) .................................. 0708374.4
Jun. 8, 2007 (GB) .................................. 0710998.6

(51) Int. Cl.
*B01J 20/22* (2006.01)
*B01J 20/08* (2006.01)
*B01J 20/10* (2006.01)
*B01J 20/20* (2006.01)

(52) U.S. Cl.
USPC ........... 502/401; 502/405; 502/413; 502/414; 502/415; 502/416

(58) Field of Classification Search
USPC .......... 502/400, 401, 405, 413, 414, 415, 416
See application file for complete search history.

(56) References Cited

U.S. PATENT DOCUMENTS 5,928,588 A 7/1999 Chen et al.
2008/0029039 A1* 2/2008 Jenkins .......................... 119/173

FOREIGN PATENT DOCUMENTS

| EP | 0379378 | 7/1990 |
| EP | 0492081 | 7/1992 |
| WO | WO 01/62367 | 8/2001 |
| WO | WO 02/083560 | 10/2002 |

OTHER PUBLICATIONS

Transaction History listing for U.S. Appl. No. 12/598,223. Viewed Jan. 17, 2012.*

* cited by examiner

*Primary Examiner* — Stuart Hendrickson
*Assistant Examiner* — Daniel Berns

(57) ABSTRACT

The invention is directed to shaped composite adsorbent material, comprising particulate activated carbon material, bound by a suitable binder, preferably selected from the group of sodium alginate calcium alginate, chitosan, polyacrylamide, polyethylene oxide and mixtures thereof, more in particular a combination of chitosan and alginate, whereby the activation of the carbon material has taken place before binding the material.

18 Claims, No Drawings

COMPOSITE ADSORBENT MATERIAL

The object of the present invention is to provide strong self-supporting composite adsorbent structures containing a minimum of material not contributing to the overall adsorption capacity.

Composite adsorbents in the present invention comprise at least a, preferably particulate, adsorbent and a binder, thereby providing a strong self-supporting adsorbent structure The composite adsorbent ds in a form which can be readily contained within a bed, which provides a low pressure drop, a high external surface area and a short diffusion path to access the internal surface area.

The composite can be in the form of shaped particles, filaments or in the form of a honeycomb or monolith.

The preferred adsorbent is activated carbon, a microcrystalline, non-graphitic form of carbon which has been processed to increase internal porosity. Activated carbons are characterized by a large specific surface area, typically in the range of 400 to 2500 $m^2/g$. By its large internal surface activated carbon is especially suited for the physical adsorption of adsorbates. The relation between the dimension of the pores and the dimension of the adsorbate determines the adsorption efficiency. In view of the pore size distribution of activated carbons some very large adsorbates, as humic acids, or some very small adsorbates, as metal ions, do not adsorb very well.

The activated carbon surface area is mainly not polar, so not polar, or apolar, adsorbates are better adsorbed than polar adsorbates. Other adsorbents, such as ion exchange materials or some silica's, alumina's or zeolites, can be more effective for adsorption of some other, special, adsorbates. It would thus be useful to be able to include such other materials in the composite adsorbent.

Pore sizes are defined by the International Union of Pure and Applied Chemistry as micropores (pore width <2 nm), mesopores (pore width 2-50 nm), and macropores (pore width >50 nm). Micropores and mesopores contribute to the adsorptive capacity of the activated carbon. The macropores are too wide for most adsorbates to adsorb in an efficient way. However they can be important for the kinetics.

Activated carbon adsorbents are generally produced in the form of powders, with different particle size distributions, in the form of granules as broken carbons, with different particle size distributions, and in the form of extrudates, with different form (cylinders, macaroni's trilobes, quadrilobes, etc) and dimensions. Activated carbon can also be produced in special forms as cloth fibers, blocks, plates, monoliths or honeycombs for different reasons. The shape of the activated carbon is of influence on the adsorption kinetics, the pressure drop and the water resistance. Special forms are produced to combine the advantages of the use of powders and the advantages of the use of granules.

Commercial activated carbon has generally been made from material of plant origin, such as wood (hardwood and softwood), corncobs, kelp, coffee beans, rice hulls, fruit pits, nutshells, e.g. from coconut, and wastes such as bagasse and lignin. Activated carbon also has been made from peat, lignite, soft and hard coals, tars and pitches, asphalt, petroleum residues, polymers and carbon black.

Activation of the raw material is accomplished by one of two distinct processes: 1) chemical activation, or 2) gas activation.

For full scale production steam is usually used as gas in gas activation. The effective porosity of activated carbon produced by steam activation is the result of gasification of the carbon at relatively high temperatures (when necessary after an initial carbonization of the raw material). By steam activation carbons can be produced with a well developed micropores structure. By longer activation larger micropores and small mesopores are developed, partly at the cost of the small micropores. The pores size distribution is also dependent of the raw material and activation conditions.

Chemical activation typically is carried out commercially by impregnation of the (not carbonized) carbonaceous material precursor with a chemical activation agent, (mostly phosphoric acid or zinc chloride) and the impregnated material is heated to a temperature of 350° C.-700° C. The porosity of chemically activated products is generally created by chemical dehydration/condensation reactions occurring at significantly lower temperatures than steam activation. By chemical activation carbons can be produced with a well developed mesopore structure with or without a good developed structure of large micropores or some small macropores. The choice of the raw material in combination with the activation conditions determines the pores structure To produce powders, activated carbon lumps are milled in different ways. To produce granules with different fractions, activated carbon lumps are broken and sieved. To produce extrudates and special forms, as fibres, cloth, and monoliths, shaping is generally carried out before activation, for example by extrusion. In case a binder is used the binder must be activatable. An advantage of this method is that binding by added binders and activation are carried out in one step. However, also shaping after activation is carried out on limited scale to produce extrudates and special forms. For shaping after activation binders have to be chosen with good binder properties preferable without blocking pores. An advantage of binding after activation is a large flexibility in binders and the applicability of different binding processes from heat treatment to chemical conversion. Binding after activation makes it possible to combine activated carbons with different pores size distributions in one shape, creating adsorbents with a pores distribution which not can be produced by binding before activation.

The activation process is limited in creating bi- or trimodal pore size distributions in the micro- and mesopores range. Activated carbons can also be combined with other adsorbents to extent the adsorption capability for the adsorption of adsorbates which do not adsorb on activated carbon very well. By producing granules or special shapes by binding powders macropores are formed, originating from the voids between the powder particles These macropores play a limited role for the adsorption but can be important for the kinetics. Bed porosity originates as a consequence of voids between particles itself. The bed porosity does not contribute to the adsorption capacity of activated carbon. In this respect the bed porosity must be as small as possible. However, a higher bed porosity decreases the pressure drop or water resistance. So a compromise will be necessary.

The adsorption properties of activated carbon permit its industrial use in the purification of liquids and gases by the adsorption of impurities. Dependent of the nature, the matrix and the concentration of the impurities and dependent of the purification process, activated carbons are chosen with optimal properties.

For the performance of activated carbon the equilibrium adsorption capacities as well as the kinetics are important.

The equilibrium adsorption capacity is the maximum adsorption capacity of the activated carbon for the present impurities. The equilibrium adsorption capacity is mainly determined by the optimal pores size distribution in the micropores, mesopores and small macropores range.

In commercial applications the breakthrough criteria, or the adsorption time, determine the life time of a filter or the dosing quantity. In fixed bed processes the filter has to be put out of use before complete breakthrough takes place. In batch processes the time up to equilibrium adsorption can be too long. Carbon is replaced before complete equilibrium is reached. The kinetics is determined by the pores size distributions among which the macropores and the particle dimensions and shape. For the kinetics especially the particle-external-area/particle-volume ratio is important. The kinetics increase when this ratio is higher For applications physical properties as pressure drop, water resistance or filterability and hardness attrition, causing dust, are important. A higher particle-external-area/particle-volume ratio gives an increase in pressure drop and water resistance and a higher attrition.

Commercial grades of activated carbon are designated as either gas-phase or liquid-phase adsorbents. Liquid-phase carbons generally may be powdered, granular, or special forms and gas-phase, vapor-adsorbent, carbons are generally hard granules or hard, relatively dust free special forms For example, a gas which is to be purified, is passed through a bed of granular activated carbon. As the gas passes through the activated carbon bed, molecules of impurities in the gas are adsorbed onto the surface of the activated carbon. The carbon bed is taken out of use when breakthrough takes place.

In recovery applications, such as solvents recovery or gas separation, the adsorbates adsorbed on the carbons are desorbed by countercurrent vacuum treatment, heat treatment and steaming. Low boiling compounds can be recovered by counter current desorption with air. For recovery a compromise has to be chosen for pores having an optimal adsorption dimension but limited adsorption forces permitting desorption.

In small scale liquid phase batch processes, as in the pharmaceutical industry, purification with powdered carbon fits very well The process equipment can be very simple and the flexibility is large. A disadvantage of the use of powders is the handling causing escaping dust. After purification the carbon has to be filtered, which can be time consuming.

Very large quantities of water, contaminated with low concentrations of pollutants, can on commercially scale only be purified in a fixed bed process. After breakthrough the carbon can be reactivated at high temperature with steam and reused.

In some countries the availability of high quality potable water is limited and contaminants in the water can be removed by using a point of use filter, directly connected to the tap, optionally in combination with membranes. For this application the carbon powder is bound in the form of a block, with a relative low water resistance. Compared with filtration with powder handling and dust problems have been solved. Replacing a block after breakthrough is very simple To purify large flows of exhaust gases honeycomb catalysts consisting of an aluminum oxide carrier and a noble metal catalyst are used As a consequence of the very high external-surface-area/volume ratio the pressure drop is low and the kinetics are very fast.

Also for the recovery of fuel vapor from the fuel tank in cars in Evaporative Loss Control Devices (ELCD), to prevent emission of fuel vapor to the environment, a small guard bed with special particles or a honeycomb with a high external surface area/volume ratio is applied. Also here low pressure drop and a fast kinetics are combined The object of the present invention is to provide activated carbon in a form which is readily contained within a bed or is in the form of a honeycomb-like or monolith-like structure, providing a low pressure drop, a high external surface area and a short diffusion path to access the internal surface area. A high external surface area and a short diffusion path can be expressed in terms of an external surface area to volume ratio which for conventional 3 or 4 mm extruded pellets is less than $1.6 \text{ mm}^{-1}$.

According to the present invention, shaped particles of carbon containing composite adsorbent, having an external surface area to volume ratio greater than $1.8 \text{ mm}^{-1}$ are formed from activated carbon held together with a binder, preferably based on a combination of alginate salt and chitosan. These adsorbents may contain a fibre, filament, thread or yarn reinforcement, but are preferably not in the form of a woven or non-woven fabric or beads. Woven or non-woven carbon fabrics or indeed beads of less than 3 mm diameter do have high external surface area to volume ratio but when formed into a bed with adequate carbon loading these inherently have a high pressure drop across the formed bed.

Powders can be compressed into shaped pellets or monoliths or honeycombs by, for example, extrusion under pressure (typically >100 lbs/in$^2$) with a binder to hold the particles together. However, much of the mass transfer benefits of the powder can be lost and the effect of the pressure used and the binder both tend to reduce the accessible surface area of the carbon available for adsorption. The stronger the extrudate required both in terms of the crush strength and the attrition resistance, the more this is the case.

Larger external surface area to volume ratio may be obtained if instead of circular cross-section the particle has a more complex cross-sectional shape. Thus, for example, it may be trilobal or have a cross-section in the shape of a cross, with the arms of the cross preferably having a thickness of no more than half their length. A 10 mm long pellet extruded with such a cross-section and 4 mm diameter will have an external surface area to volume ratio of $2.5 \text{ mm}^{-1}$ compared to $1.2 \text{ mm}^{-1}$ for a cylindrical pellet. Such pellets are as readily contained in a bed as cylindrical pellets.

In the extreme, an adsorption bed may be formed from a single continuous carbon filament. A uniformly packed annular bed may be formed by cross-winding such a filament onto a perforated former. Uniformity of packing and adequate void space to allow a low pressure drop across the bed in use may be achieved by building in controlled cross-sectional shrinkage of the filament during drying. The lower the concentration of the binder solution and the carbon to binder solution ratio used, the higher will be the cross-sectional shrinkage.

An important advantage of the present invention resides therein that the carbon has been activated prior to shaping, thereby enabling the provision of specifically shaped forms, which are difficult to obtain when the material has to be activated after binding. This further makes it possible to use binders that are not resistant to activation. Further, it makes it possible to include other components in the composite material which are not resistant to the activation treatment.

Methods for constructing adsorbents in the form of honeycomb-like or monolith-like structures and the benefits of these structures over conventional beds made from pellets have been described. However these structures depend on the use of support materials, such as woven or non-woven fabrics, paper, card or metal foil, to lend shape to the structure to which the adsorbent material is attached using a binder. Although such support materials may represent a small though significant proportion of the overall weight and volume of the bed, they do not contribute significantly to the overall adsorption capacity of the bed. This invention describes the production of a honeycomb-like or monolith-like structure without the use of a support. In cross section the monolith must have thin a wall thickness with as a consequence a short diffusion length to its centre.

The adsorbent described in this invention is an activated carbon, optionally in combination with another adsorbing material selected from silica, alumina, an ion-exchange resin or a mixture thereof. At least 50 wt % of the particles size distribution is below 0.02 mm.

If desired, more than one adsorbent may be incorporated into the shaped particle. Where one of adsorbents is an inorganic gel, it may be included as a hydrogel. Activation of the carbon is performed prior to shaping. Where the carbon used is already activated prior to shaping the binder used must not significantly block the active surface of the carbon.

Preferred binders in this case include organic polymers such as (sodium) alginate, chitosan, polyacrylamide or polyethylene oxide, or it may be inorganic such as bentonite or sepiolite, or a combination of organic or inorganic binders such as bentonite and polyethylene oxide. When these binders are used high pressure is not required to form strong particles and as a result there is little or no loss of adsorption capacity during shaping.

The binder is made up in water prior to addition of carbon or in the case of chitosan in 1% acetic or formic acid. The concentration of the binder solution may be between 0.5 and 20% and preferably between 2 and 16%. A suspension of carbon in sodium alginate may be forced through an orifice into a metal salt solution, for example a calcium chloride solution, to form an insoluble and flexible continuous filament. Similarly a solution of chitosan containing powdered carbon may be forced through an orifice into a solution of dilute ammonium hydroxide to form an insoluble flexible continuous filament.

The binder may comprise between 0.1% and 50%, preferably 0.2% to 25% and more preferable 2-20% of the overall weight of the composite.

For reinforcing the composites a short fibre can be included into the composite mixture prior to shaping. The fibre used may be natural such as cotton or paper pulp, synthetic such as polyester, polyamide, polyolefin or viscose, or inorganic such as glass or aluminium silicate including kaowool. The fibre fineness should be less than 30 μm and length should be shorter than 50 mm but preferable between 1 and 20 mm and more preferably between 2 and 5 mm. The fibre may comprise between 0.5 and 20% of the composite and preferably between 1 and 10%.

For producing a filament a reinforcing thread of, for example, bleached cotton or glass may be included along the centre line of the filament, if necessary. This is conveniently accomplished by passing the thread through a bath of carbon and binder before insolubilizing the binder. The thickness of the filament produced depends upon the viscosity of the mix.

The invention provides a method of making a self-supporting bed of adsorbent having the form of a honeycomb or a monolith with porous walls and regular channels running the length through which polluted fluids may be passed for purification. Such a bed offers the benefits of high uniform flow, low pressure drop and high rates of adsorption.

To provide such a structure the adsorbent is pasted with a solution or suspension of the binder in water (if necessary with pH adjustment) and the fibre worked therein to give a stiff paste of uniform composition. Alternatively the binder may be added after suspending the adsorbent and fibre in water. The paste may be then moulded, pressed, rolled or otherwise shaped into the individual elements of the final structure. The individual elements may be assembled to form a bed before or after drying. In the case of a honeycomb structure the individual elements consist of flat sheets and corrugated sheets which are assembled alternately to provide the required structure. In the case of a monolith structure the individual elements consist of sheets having on at least one side ridges and grooves such that when assembled they form a block of adsorbent with uniform channels running through the block.

The adsorbent loading and hence the adsorption capacity of the bed, the rate of adsorption and the resistance to fluid flow will depend on the thickness of the individual elements of the bed and the dimensions of the interstices.

In the composites the carbon (or adsorbent mixture) will comprise between 50% and 98% of the weight of dried particles and preferably between 80% and 98% w/w in order to maintain a high adsorption capacity of the particles. The higher the proportion of binder used the stronger the particle. The relationship between particle strength and the concentration of binder solution used must be determined by experiment since it varies with the pore volume and liquid uptake of the carbon used.

Where the shaped particles are to be used for air purification they must be dried prior to use. This is conveniently done by e.g. heating in a current of air at 120° C.

Where the composition is to be used in water purification, chitosan is found to be particularly useful since it has the highest propensity to remove metal ions through ion exchange or complexing.

The invention will be further apparent from the following examples

EXAMPLE I 8 g of activated carbon was mixed with 20 g of 12% sodium alginate and the resulting paste was pressed through an orifice having a cross-shape directly into a 2% solution of calcium chloride and chopped into 8 mm lengths. After washing and drying the longitudinally ridged pellets were very strong and exhibited a high surface area to volume ratio and when packed into a bed provided a low back-pressure to air passed through the bed.

EXAMPLE 2

Table 1 demonstrates the improved rate of adsorption obtained over shaped particles made according to the invention.

The rate of adsorption of carbon tetrachloride on a cylindrical pellet with an external surface area to volume ratio of 1.50 was compared with that on a pellet with a cross-shaped cross-section with an external surface area to volume ratio of 2.40 made as in Example 1. The amount of CTC adsorbed on the carbon at time t is expressed as proportion of the total amount adsorbed at saturation $(A_t/A_S)$

TABLE 1

| Time mins | Cylindrical Pellet $A_t/A_s$ | Shaped pellet $A_t/A_s$ |
| --- | --- | --- |
| 15 | 0.239 | 0.261 |
| 30 | 0.386 | 0.473 |
| 45 | 0.478 | 0.712 |
| 60 | 0.528 | 0.872 |
| 75 | 0.593 | 0.920 |
| 90 | 0.646 | 0.938 |

EXAMPLE 3

Example 2 demonstrates that the adsorption capacity of the carbon used to form shaped particles according to the invention is not significantly reduced by the process.

6 g of activated carbon having a CTC value of 111% (capacity for adsorption of carbon tetrachloride 1.11 g/g) was mixed with 20 ml of 4% sodium alginate and the suspension was pumped through a 1.5 mm circular oriface, using a peristaltic pump, directly into a 2% solution of calcium alginate to produce filaments over 200 mm long.

After washing with water the filaments were flexible but strong enough to be handled and were packed into a bed prior to drying. After drying the filamentous particles were found to have a CTC value of 109%.

EXAMPLE 4

An adsorbent honeycomb was made using a paste with the following composition

| | |
|---|---|
| Activated carbon | 91.7% |
| Polyacrylamide | 4.6% |
| Polyester fibre | 3.7% |

The fibre had a diameter of 20 μm and a length of 3 mm.
The composite had a pore volume of 1.77 cm3/g.

The rate of adsorption of carbon tetrachloride on the honeycomb was compared to that on a cylindrical activated carbon pellet. The amount of CTC adsorbed at time was expressed (Table 2) as a proportion of the total amount adsorbed at saturation)

TABLE 2

| Time mins | Cylindrical Pellet $A_t/A_s$ | Shaped pellet $A_t/A_s$ |
|---|---|---|
| 15 | 0.239 | 0.446 |
| 30 | 0.386 | 0.623 |
| 45 | 0.478 | 0.712 |
| 60 | 0.528 | 0.763 |
| 75 | 0.593 | 0.797 |
| 90 | 0.646 | 0.816 |

EXAMPLE 5

An adsorbent monolith was made from individual elements in the form of 2 mm thick sheets having grooves 1 mm deep every 3 mm. The monolith was self supporting and made from a paste with the following composition:

| | |
|---|---|
| Activated carbon | 89.16% |
| Bentonite e | 8.92% |
| Fibre | 1.78% |
| Polyethylene oxide | 0.14% |

The CTC adsorption of the monolith was measured and found to be 88.7% showing that the activated carbon in the composite was expressing its full adsorption capacity

The invention claimed is:

1. Shaped composite adsorbent material having an external area to volume ratio greater than 1.8 mm$^{-1}$, comprising particulate activated carbon material, bound by a sodium alginate binder via chemical conversion with a metal salt or by a chitosan binder via chemical conversion with ammonium hydroxide, wherein during production of the adsorbent material the activation of the carbon material has taken place before binding the carbon material with the binder.

2. Material according to claim 1, containing a fibrous reinforcement material based on a fibre, filament, thread or yarn reinforcement providing a strong self-supporting adsorbent structure not having the form of a woven or non-woven fabric or beads.

3. Material according to claim 2, wherein the fibrous reinforcement material is selected from the group consisting of cotton, wood pulp, polyester, polyamide, polyolefin, viscose, glass, aluminium silicate, and kaowool.

4. Material according to claim 2, wherein the fibrous reinforcement material is of natural or synthetic origin.

5. Material according to claim 2, wherein the fibres are less than 50 mm long.

6. Material according to claim 2, wherein the amount of fibrous reinforcement material is between 0.2 and 20 wt. % of the overall weight of the material.

7. Material according to claim 2, wherein:
the adsorbent further contains silica gel, alumina or an ion-exchange resin or a mixture thereof;
at least 50 wt. % of the carbon has a particle size below 0.02 μM;
the binder comprises between 0.1 and 50 wt. % of the overall weight of the composite material;
the fibrous reinforcement material is selected from the group consisting of cotton, wood pulp, polyester, polyamide, polyolefin, viscose, glass, aluminium silicate, and kaowool;
the fibres are less than 50 mm long;
the amount of fibrous reinforcement material is between 0.2 and 20 wt. % of the overall weight of the material;
the material is in the form of a continuous filament;
the cross-sectional shape of the body is trilobal, in the form of a cross whose arms have a thickness of no more than half their length, or in the form of a honeycomb.

8. Material according to claim 1, wherein the adsorbent further contains silica gel, alumina or an ion-exchange resin or a mixture thereof.

9. Material according to claim 1, wherein at least 50 wt. % of the carbon has a particle size below 0.02 mm.

10. Material according to claim 1, wherein the binder comprises between 0.1 and 50 wt. % of the overall weight of the composite material.

11. Material according to claim 10, wherein the binder comprises between 0.2 and 25 wt % of the overall weight of the composite material.

12. Material according to claim 10, wherein the binder comprises between 2 and 20 wt % of the overall weight of the composite material.

13. Material according to claim 1, wherein the material is in the form of a continuous filament.

14. Material according to claim 1, wherein the material is in the form of a honeycomb.

15. Material according to claim 1 in the form of shaped bodies, wherein the cross-sectional shape of the body is trilobal or in the form of a cross.

16. Material according to claim 15, wherein the cross-sectional shape of the body is in the form of a cross and the arms of the cross have a thickness of no more than half their length.

17. Process for producing a material according to claim 1 comprising the step of forming particulate activated carbon material, suspended in a binder material solution comprising a combination of alginate and chitosan, into a desired shape, whereby the particulate activated carbon material is bound by a sodium alginate binder via chemical conversion with a metal salt or by a chitosan binder via chemical conversion with ammonium hydroxide.

18. Process for producing a material according to claim 7 comprising the step of forming particulate activated carbon material, suspended in a binder material solution comprising a combination of alginate and chitosan, into a desired shape, whereby the particulate activated carbon material is bound by a sodium alginate binder via chemical conversion with a metal salt or by a chitosan binder via chemical conversion with ammonium hydroxide.

* * * * *